Nov. 19, 1968     A. REITER     3,411,498
DEVICE FOR DEVELOPMENT OF THE HUMAN FEELING SENSE
Filed March 14, 1966

INVENTOR
ADOLPH REITER

BY
ATTORNEY.

3,411,498
DEVICE FOR THE DEVELOPMENT OF THE HUMAN FEELING SENSE
Adolph Reiter, 210 W. 90th St., New York, N.Y. 10024
Filed Mar. 14, 1966, Ser. No. 534,077
3 Claims. (Cl. 128—62)

ABSTRACT OF THE DISCLOSURE

A device for the development of the human feeling or touching sense, which comprises a carrier means of elastic material and a plurality of longitudinal elastic members tapered down towards the free end and extending from the entire outer surface of said carrier means in different directions. The longitudinal members are adapted to engage any part of the human body and activate the nerves of the human body responsive to touch.

---

The present invention relates to a device for the development of the human feeling sense.

The senses of the human body provide the sensations, namely, sights, sounds, tastes, smells and feelings of hardness, weight, heat, cold, hunger, thirst, weariness and pain. The senses begin to act when something disturbs one of the sense organs. These organs are connected to sensory nerves. A disturbance in the organ causes a nervous impulse in the sensory nerve. This impulse travels along the nerve to the brain where it is interpreted. The person then becomes conscious of a sensation.

In most instances five basic senses are recognized, namely, sight, hearing, smell, taste and feeling. It is well known, however, that many more than five sense organs have been found. There are special organs for touch, pressure and cold.

Touch is the sense which gives notice of contact with an object. It is also called the tactile sense. Touch gives a person some of his most important knowledge of the objects in the world around him. There are several kinds of touch organs called tactile corpuscles, in the skin and mucous membrane.

The device designed in accordance with the present invention is adapted to develop the sense of touch.

It is, therefore, one object of the present invention to provide a device which comprises substantially small bodies having rounded edges or constituting small balls, preferably of a diameter of about $\frac{1}{16}$ to $\frac{1}{4}''$, which bodies can be secured to or project from any suitable carrier as, for instance, a core. A relative sliding between the bodies and the particular nerve ends of the hands or of any other body parts brings about an effective activation of the nerves.

It is yet another object of the present invention to provide a device, wherein the bodies are secured to longitudinal members or disks.

It is also an object of the present invention to provide a device which comprises a longitudinal member terminating into a ball-shaped or a ball-like shaped end and the longitudinal grooves which permit that the massage can be carried to the end portions of the fingers and even below the fingernails, and which grooves can be equipped with a file surface.

It is still a further object of the present invention to provide a device which is made of soft or elastic material to be used with or without a cover, the latter consisting of suitable material to bring about different sensation effects upon the nerves of the human body portion to be massaged. Such cover material can be, by example, rubber or any other yielding material, an adhesive which adheres to the skin, or the like, while the carrier can be formed as an egg-shaped member or a ball-shaped member.

Figure 1:
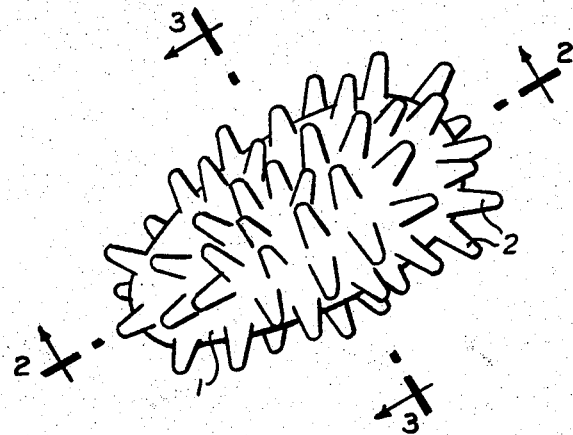
Figure 2:
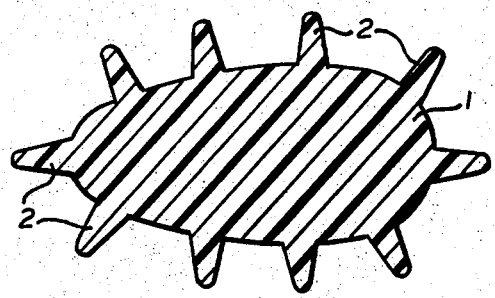
Figure 4:
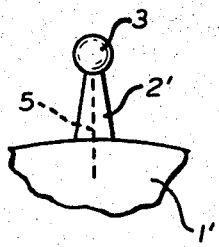
Figure 3:
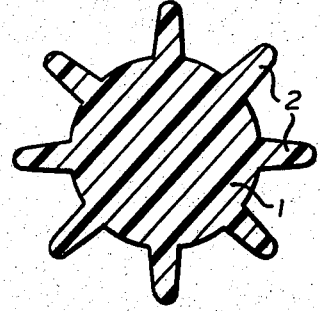
Figure 5:
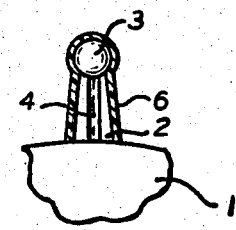

With these and other objects in view which will become apparent from the following detailed description, the present invention will be clearly understood in connection with the accompanying drawings, in which:

FIGURE 1 is a perspective front view of a device designed in accordance with the present invention;
FIG. 2 is a section along the lines 2—2 of FIG. 1;
FIG. 3 is a section along the lines 3—3 of FIG. 1;
FIG. 4 is a fragmentary view disclosing a second embodiment of the sensing means; and
FIG. 5 is a still further embodiment partly in section of the sensing means.

Referring now to the drawings and in particular to FIGS. 1, 2 and 3, the device designed in accordance with the present invention comprises a carrier 1 of elastic material to constitute a core, from which a plurality of longitudinal members 2 project either integrally or releasably therefrom, and in particular over the entire outer face of said core.

The longitudinal members 2 are preferably tapered toward the free end thereof and terminate into either ball-shaped ends or into end formations which have rounded edges.

In accordance with another embodiment of the present invention, as shown in FIG. 4, the longitudinal members 2 can terminate into small balls which have preferably a diameter of $\frac{1}{16}$ to $\frac{1}{4}$ inch. It has been found that if such end formations slide along the nerves responsive to touches, simultaneously with the exercise of small pressure, an effective and activating massage of these nerves takes place.

In addition to the ball formations 3 at the free ends of the longitudinal members 2, the present invention provides also groove formations 4 which extend longitudinally, as shown in FIG. 5 of the drawing, which serve the purpose to permit even closer engagement between the surfaces of the body and the longitudinal members and even permits to massage the portions of the fingers which are below the fingernails.

As indicated in FIG. 4, it is possible to have the longitudinal members merely connected by an elastic thread 5, which connects the longitudinal member 2' to the carrier 1', yet permits a slight removal of the longitudinal member 2' from the carrier 1', which is brought about by arranging a resilient connecting means 5 as a rubber thread.

It is to be understood that the carrier for the device, designed in accordance with the present invention, can be of any suitable shape and can, for instance, have the shape of an egg, as indicated in FIGS. 1 to 3, however, it is also possible to attach the longitudinal members 2 to any existing utensils which function as a carrier 1, as wrist band, fountain pens and pencils or the like. Furthermore, it is, of course, also possible to mount the longitudinal members 2 on other longitudinal members or disks, so that it is quite apparent that the shape of the carrier 1 itself is of no significance in connection with the present invention, as long as the members 2 project over the entire circumference of the carrier 1.

The longitudinal members can be made of yielding or elastic material and in particular can be made also of rubber, metal, glass, plastic or any suitable material.

In accordance with another development of the present invention, the longitudinal members 2 can also be supplied with a cover 6, which cover 6 can be made either of resilient material or also of adhesive material. In the case of a cover of rubber, a yielding action can be obtained, while if the cover 6 is made of adhesive material, the longitudinal members 2 will adhere to the skin and enhance the activating effect of the nerves.

While I have disclosed several embodiments of the present invention, it is to be understood that these embodiments are given by example only and not in a limiting sense, the scope of the present invention being determined by the objects and the claims.

I claim:
1. A device for the development of the human feeling or touching sense, comprising
    a carrier means of elastic material, and
    a plurality of longitudinal members tapered toward the free end extending from the entire outer surface of said carrier means in different directions, said longitudinal member being adapted to engage any part of the human body and activate the nerves of the human body responsive to touch,
    said longitudinal members have a cover thereon,
    said cover being of a material selected from the group consisting of a yielding material and an adhesive material.

2. A device for the development of the human feeling or touching sense, comprising
    a carrier means of elastic material, and
    a plurality of longitudinal members tapered toward the free end extending from the entire outer surface of said carrier means in different directions, said longitudinal member being adapted to engage any part of the human body and activate the nerves of the human body responsive to touch,
    said carrier means comprises an egg-shaped body, said longitudinal members terminating in ball-shaped ends.

3. A device for the development of the human feeling or touching sense, comprising
    a carrier means of elastic material, and
    a plurality of longitudinal members tapered toward the free end extending from the entire outer surface of said carrier means in different directions, said longitudinal member being adapted to engage any part of the human body and activate the nerves of the human body responsive to touch,
    said longitudinal members have longitudinal grooves.

References Cited

UNITED STATES PATENTS

| 726,727 | 4/1903 | Mills. | |
| 1,111,427 | 9/1914 | Archibald. | |
| 1,724,842 | 8/1929 | Kazmazyk | 128—62 |
| 2,141,969 | 12/1938 | Benz | 128—62 |
| 2,466,470 | 4/1949 | Norris | 128—57 |
| 2,777,440 | 1/1957 | Baker. | |
| 3,231,925 | 1/1966 | Conder. | |

FOREIGN PATENTS 1,218,925    12/1959    France.

L. W. TRAPP, *Primary Examiner.*